Aug. 12, 1941.   W. F. BERCK   2,251,974
PREDETERMINING COUNTER FOR FLUID METERS
Filed June 6, 1938   2 Sheets-Sheet 1
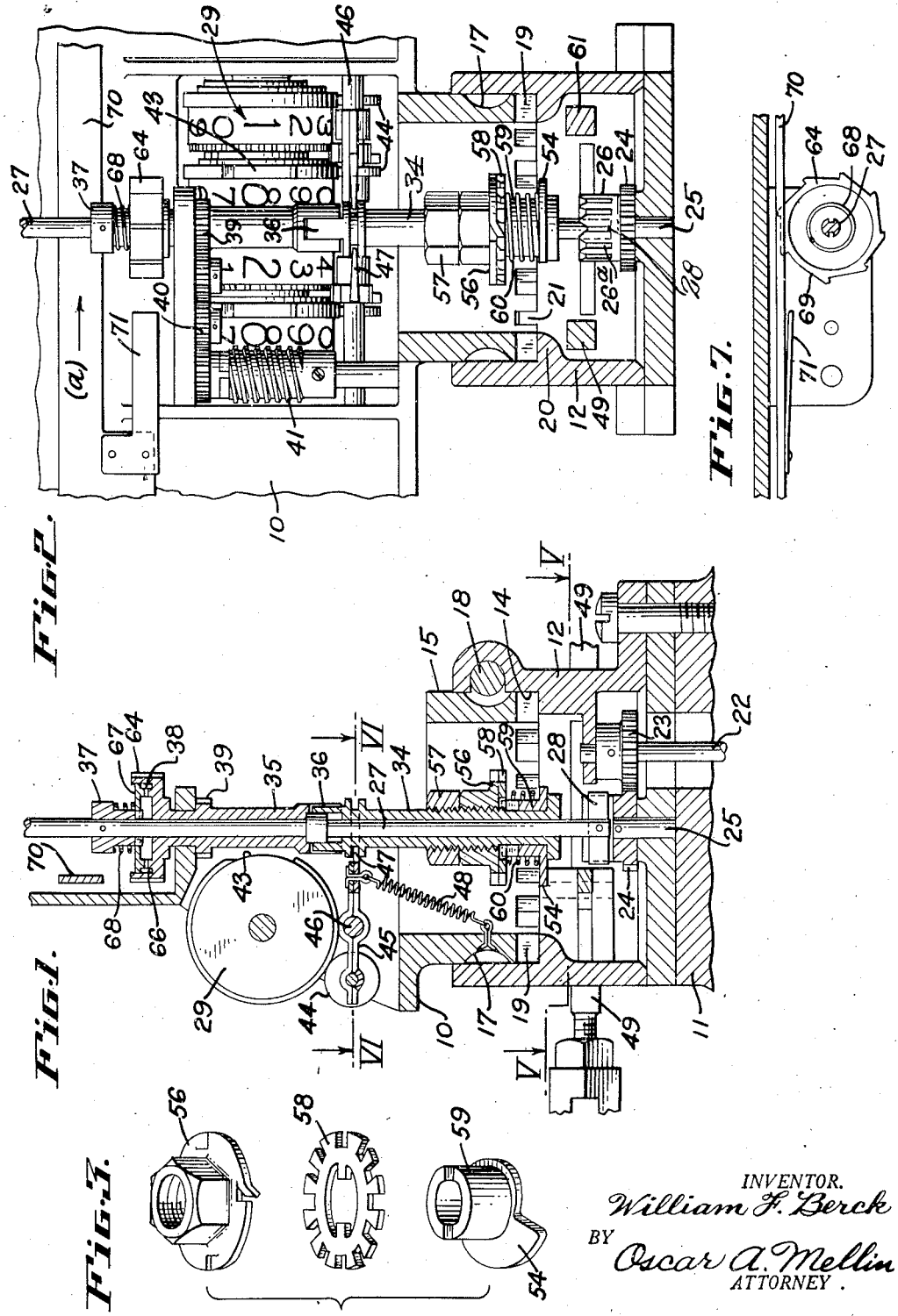
INVENTOR.
William F. Berck
BY Oscar A. Mellin
ATTORNEY.

Aug. 12, 1941.  W. F. BERCK  2,251,974

PREDETERMINING COUNTER FOR FLUID METERS

Filed June 6, 1938   2 Sheets-Sheet 2

INVENTOR.
William F. Berck
BY
Oscar A. Mellin
ATTORNEY.

Patented Aug. 12, 1941

2,251,974

UNITED STATES PATENT OFFICE 2,251,974

PREDETERMINING COUNTER FOR FLUID METERS

William F. Berck, Hayward, Calif., assignor to Ralph N. Brodie Company, Oakland, Calif., a corporation of California Application June 6, 1938, Serial No. 212,113

17 Claims. (Cl. 235—132)

This invention relates to shut-off devices for liquid meters and particularly pertains to an apparatus for use in connection with liquid meters which may be preset and which will operate to discontinue the meter operation automatically when the volume of liquid predetermined by the setting of the apparatus has passed through the meter.

It is the principal object of the present invention to provide a generally improved and simplified apparatus of the character referred to which will operate accurately and satisfactorily under all conditions of meter operation.

One form which the invention may assume is exemplified in the following description and illustrated by way of example in the accompanying drawings, in which:

Fig. 1 is a fragmentary view in central vertical section through a fluid meter and a counting mechanism, disclosing my improved mechanism associated therewith.

Fig. 2 is a fragmentary view in section taken at right angles to Fig. 1, disclosing the same mechanism.

Fig. 3 is a collective view in perspective showing the clutch mechanism between the tripping cam and its driving sleeve.

Fig. 7 is a fragmentary view in plan and section showing the means for returning the units wheel of the predetermining counter to its full cycle position.

Figure 4:
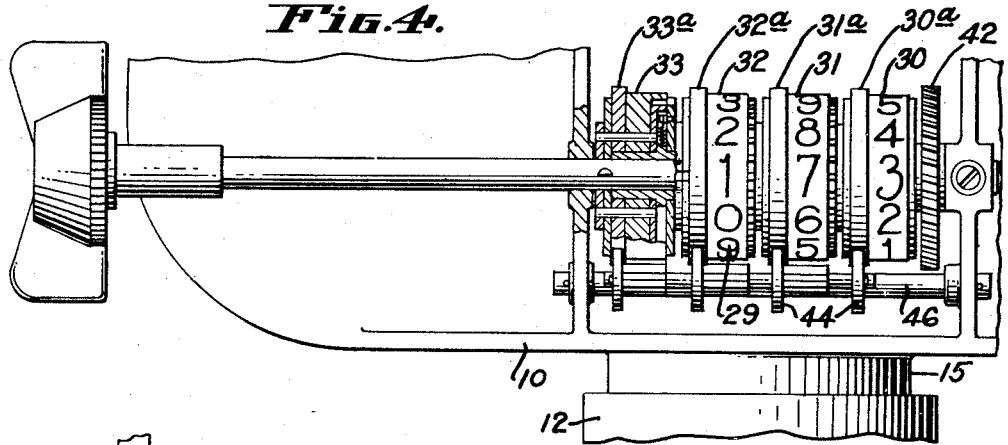
Fig. 4 is a view of the revoluble tripping members and their associated counter wheels in front elevation with one of said tripping members and its associated counter wheel in section.

Referring more particularly to the accompanying drawings, 10 indicates a counter mechanism frame for supporting a counter of the type illustrated in my copending application entitled "counting and indicating device for fluid meters," filed April 11, 1938, bearing Serial No. 201,338. It is my intention to employ the apparatus disclosed in this present application in connection with the counter and indicating device disclosed in the application referred to, although I do not limit myself to such use as I am aware that my present apparatus can be used with counting and indicating mechanisms of various types and designs, or in fact separately from counting and indicating mechanisms of any type.

In the drawings, 11 indicates a fluid meter upon which the counter mechanism frame 10 is mounted. A swivel bearing 12 is secured on the casing of the meter 11 which is bored as at 14 to rotatably receive a trunnion 15 formed as an integral part of the counter frame 10. The trunnion 15 rotatably fits the bore 14 of the swivel bearing 12, and is provided with an external circumscribing groove 17 engaged with which is a bolt 18 extending chord-like through the swivel bearing 12 at one side thereof in a position to engage the groove 17. When the bolt 18 is in position, the trunnion 15 is locked against endwise movement in the bearing 12. This bolt 18 is removable, however, so that it may be extracted to release the trunnion 15 so that the latter may be moved axially upward with respect to the swivel bearing 12.

To normally hold the trunnion 15 from rotating in the swivel bearing 12, the lower end of the former is provided with a series of radial slots 19 in its lowermost end. These slots 19 are spaced equal distances apart circumferentially of the lower end of the trunnion 15, and one of them (depending upon the angular position of the counter frame) is adapted to be engaged by a fixed latch lug 21 projecting upwardly from an internal annular shoulder 20 at the lower end of the bore 14, and against which the lower end of the trunnion 15 abuts. Such engagement of one of the slots 19 with the latch lug 21 holds the trunnion 15 against rotation with respect to the swivel bearing 12 and the meter. However, by withdrawing the bolt 18, the trunnion 15 may be moved axially upward with respect to the swivel bearing 12 to disengage the latch lug 21 from the slot 19, enabling the trunnion 15 to be rotated relative to the swivel bearing 12 a desired amount. Thereafter, by lowering the trunnion and engaging the lug 21 with the registering slot 19 and again positioning the bolt 18, the trunnion 15 is again secured in the desired position. Therefore, it is obvious that the position of the counter frame 10 may be angularly adjusted with respect to the meter.

The counter frame 10 carries the apparatus with which this application is particularly concerned. This apparatus is a predetermined mechanism for releasing a shut-off valve latch bar after a predetermined amount of meter operation. The mechanism is capable of being preset so that the meter operation will automatically cease after a predetermined volume of fluid has passed therethrough by the medium of releasing the latch bar and closing a valve controlling the meter port.

Referring to Fig. 1, the meter counter drive shaft is indicated by the numeral 22 which is fitted with a spur gear 23 in constant mesh with a spur gear 24 fixed on a stub shaft 25. At its upper end this gear 24 is provided with a relatively fixed spline clutch part 26 provided with axially extending radial slots 26a extending downwardly from its upper end. In the present instance I have shown the number of slots 26a in the clutch member 26 as agreeing with the number of slots 16. The upper ends of the slots 26a are enlarged as illustrated in Fig. 2 to facilitate engagement of a complemental clutch part or blade 28 fixed at the end of a counter drive shaft 27. This shaft is journaled in the counter frame 10 and is arranged vertically and in axial alignment with the stub shaft 25. It is to the lower end of this shaft 27 that the blade-like clutch part 28 is fixed, which clutch part will engage the slots 26a, when the lower end of the shaft 27 is projected endwise into the spline clutch part 26. However, when the counter frame 10 is elevated, as previously described, for angular adjustment, the fixed clutch member 28 disengages from the slots 26a so that the entire counter frame 10 together with the counter drive shaft 27 may be turned with respect to the meter, without imparting any turning movement to the shaft 27 relative to the counter frame, and consequently undisturbing the mechanism associated with said shaft.

Mounted on the counter frame 10 is a predetermining counter 29 comprising four counter wheels—a units counter wheel 30, a tens counter wheel 31, a hundreds counter wheel 32 and a thousands counter wheel 33, which are connected together by transfer mechanism as shown in my Letters Patent of the United States No. 2,082,375, dated June 1, 1937. These counter wheels of the predetermining counter 29 may be independently set for predetermining the amount of liquid to be discharged through the meter before the shut-off valve is closed in a manner such as illustrated and described in my aforesaid Letters Patent of the United States Inasmuch as the transfer mechanism between the counter wheels and the mechanism for setting the wheels constitutes no part of my present invention, it is not here shown. While for this purpose I prefer to employ the type of mechanism shown in my mentioned prior patent, any other mechanism capable of accomplishing the same purposes may be employed.

I desire to point out when setting the predetermining counter 29, the counter wheels thereof are retrograded from zero so that the displayed numerals thereon will indicate the volume of liquid it is desired to have passed through the meter before the tripping of the shut-off valve is effected. After setting and when the shut-off valve is open and the meter commences operating, the wheels will be driven in the same direction by the meter until the zero position of all the wheels is reached, at which point the tripping of the shut-off valve will be effected.

This driving of the predetermining counter is effected as follows: Referring to Figs. 1 and 2, it will be seen that two sleeves 34 and 35 are freely mounted on the counter drive shaft 27. These two sleeves are free to move axially with respect to each other a limited amount but are fixed against relative rotation by a slip key joint 36 between them. Mounted on the shaft 27 is a fixed collar 37 which is connected through the medium of an overrunning dog clutch 38 to the sleeve 35, and in that the latter sleeve 35 is connected to the sleeve 34, rotation of the shaft 27 will, through the medium of the collar 37 and the overrunning clutch 38, impart a drive to the sleeves 34 and 35. A spur gear 39 is fixed on the sleeve 35 and through a train of gears 40 imparts a drive to a worm 41 which in turn drives a worm wheel 42 connected to the units wheel 30, the driving connection between the worm wheel 42 and said units wheel 30 being illustrated in my prior United States patent hereinbefore referred to.

It will be noticed that each of the counter wheels 30 to 33, inclusive, are provided with a fixed trip wheel 30a, 31a, 32a and 33a, each of which is formed with a recess in its periphery as illustrated at 43 in Fig. 1. When the predetermining counter is in tripping position, the tens, hundreds and thousands wheels will be in the zero position and the units wheel will be in the 1 position; that is, one station from zero position. At this time all of the notches 43 of all four wheels will be in alignment and in register with rollers 44 rotatably mounted in alignment on the free end of a wide fulcrum lever 45 pivoted intermediate its ends as at 46 to the counter frame 10. The other free end of this fulcrum lever is provided with a bifurcated portion collared as at 47 to the sleeve 34. In that the roller end of the fulcrum lever will be free to move upwardly into the recesses 43 at this time a spring 48 will move the bifurcated end 47 of the lever 45 downwardly, imparting a downward movement to the sleeve 34, which, as will be described, conditions the trip mechanism for tripping the shut-off valve when the units wheel advances from the first station to the zero position.

Figure 5:
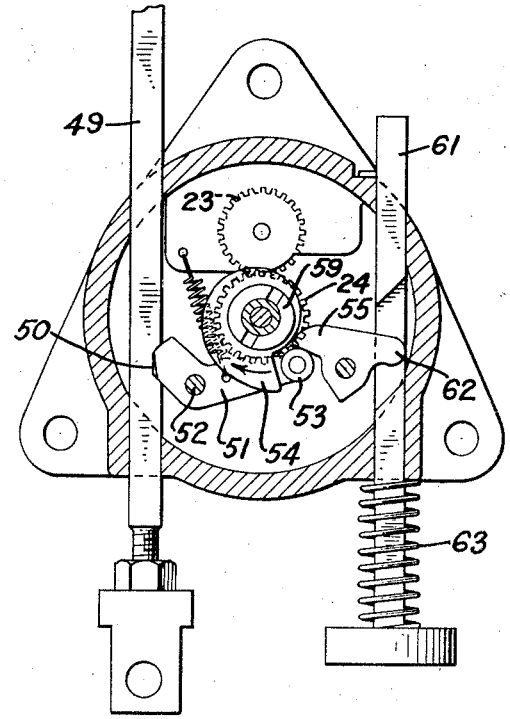
Fig. 5 is a plan section taken on line V—V of Fig. 1.
Figure 6:
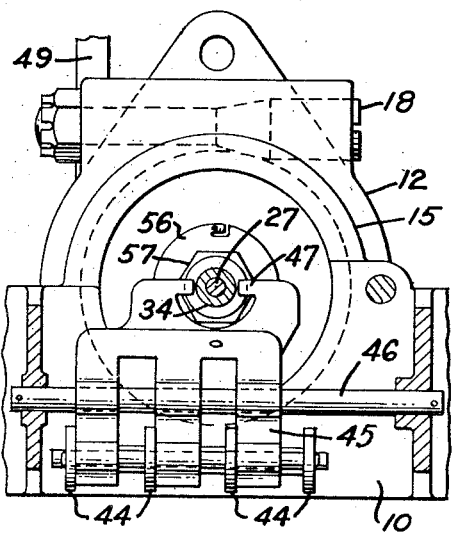
Fig. 6 is a plan section taken on line VI—VI of Fig. 1.

Referring to Figs. 1 and 5, it will be seen that extending through the fixed swivel bearing 12 is a valve latch rod 49 which is connected to any preferred standard type of shut-off valve, which is urged to close either by spring or fluid pressure, or by both, so that when the valve is open, there is a constant pressure exerted on the latch bar 49 to move the same endwise in the valve closing direction. It is contemplated here to latch this bar in a position holding the valve open and that when the tripping position of the mechanism is reached, the bar 49 be unlatched to enable the valve to close.

For this purpose the latch bar 49 is provided with a latching recess 50 to be engaged by a latch dog 51 pivoted as at 52. One end of this dog is adapted to engage the latch recess 50 while the other end is provided with a cam roller 53 for engagement with a tripping cam 54, or with a trip dog 55.

A tripping cam 54 is normally connected with the sleeve 34 for rotation simultaneously therewith. However, when any one of the rollers 44 is not in alignment with its companion recess 43, the cam 54 is maintained in a position where it will not engage the cam roller 53 on the latch dog 51. However, when the rollers 44 all align with their respective recesses 43 in the trip wheels, the accompanying movement of the fulcrum lever lowering the sleeve 34 moves the cam 54 into a position where it may engage the cam roller 53, and this is what was meant by "conditioning the trip mechanism for tripping the latch bar 49 and thereby enabling the shut-off valve of the meter to close".

It is desired to point out, as previously stated, that the recess 43 of the units wheel is circumferentially differently positioned with respect to the numerals on its wheel than are the recesses 43 on the tens, hundreds and thousands wheels, so that all of the recesses 43 will align when the tens, hundreds and thousands wheels are in the zero position, while the units wheel will be in the 1 station from the zero position. Thus, the tripping mechanism is conditioned for operation when the units wheel is approximately one gallon from the point where it is desired to shut off the meter. The reason for this is that extreme accuracy is desired and consequently the actual tripping of the latch bar 49 is accomplished by the cam 54 moving the latch dog 51 to unlatching position, when a definite point on the cam registers with the cam roller 53.

Thus, when the rollers 44 of the fulcrum lever first move into the recesses 43 of the trip wheels and the cam is lowered into alignment with the cam roller 53, the predetermined volume of liquid to pass through the meter is substantially 1 gallon short of the exact amount. However, at this time the proper high point on the cam is not in register with the roller 53 so that no tripping will be effected, but as the units wheel reaches zero, the cam will be driven therewith, and when the exact amount of fluid has been passed through the meter and the units wheel reaches zero, the proper high point on the cam will have registered with the cam roller 53 and move the latch dog 51 out of latching engagement with the latch bar 49, and the shut-off valve will be permitted to close.

It is seen that inasmuch as the cam is substantially driven directly from the meter counter drive shaft 22, that the mechanical losses between the meter counter drive shaft 22 and the cam will be practically nil, so that the shut-off will occur accurately at the predetermined point.

In the event that the counter head is turned, as previously described, with relation to the meter, I have providerd a means for quickly adjusting the position of the cam 54 with respect to the shaft 27 to compensate for this change. This means comprises a dog clutch plate 56 which is threaded on the sleeve 34 and capable of being locked in position by a lock nut 57. This dog clutch plate has four ratchet teeth equally spaced circumferentially thereabout. A second latch plate 58 is provided which has a number of teeth corresponding with the number of slots 19 in the trunnion 15 of the counter frame 10. This clutch plate, as illustrated in Fig. 3, is splined onto the hub 59 of the cam 54 and ordinarily constitutes the driving connection between the cam 54 and the sleeve 34. By moving this clutch plate against the action of a spring 60 (which is interposed between the cam and said plate) sufciently to disengage it from the teeth of the clutch plate 56, the cam 54 and the clutch plate 58 may be rotated relative to the clutch plate 56 and consequently the shaft 27 to a position properly corresponding to the new angular position of the counter head.

In order to adjust the exact trip off point of the cam with respect to the cam roller 53 on the latch dog 51, I have provided a means for adjusting the angular position of the cam on the shaft 27. This is done by releasing the lock nut 57 and adjusting the clutch plate 56 circumferentially relative to the shaft which at the same time adjusts the position of the cam, and then tightening the lock nut 57 to lock it in its set position.

In the event that it is necessary to shut the shut-off valve and stop the meter operation at any time between the commencement of delivery of fluid and before the valve is tripped by the apparatus herein disclosed, I have provided an emergency release lever 61 (see Fig. 5). This release lever is reciprocably mounted in the swivel bearing 12 and is slotted so as to engage one end 62 of the trip dog 55. It is obvious that by moving this lever in one direction against the action of a spring 63, that the clutch dog 55 will be operated to engage the cam roller 53 and move the latch dog 51 from latching position and thereby releasing the latch bar 49, and permitting the shut-off valve to close.

I desire to point out here that due to the fact that the emergency stop may be operated, when the units wheel is at a position other than a full cycle position, it is necessary to return this units wheel to a full cycle position before resetting the mechanism for a subsequent operation. This is done in order that absolute accuracy in the volume of the subsequent delivery may be had. For this purpose I provide a ratchet wheel 64 which is fixed to the upper end of the sleeve 35 and is formed internally with a clutch face 66 forming a part of the overrunning clutch 38. The other part of the overrunning clutch 38, or that indicated by 67, is splined to the collar 37 and normally held in engagement with the clutch face 66 by a spring 68. The outer face of the ratchet 64 is provided with eight ratchet teeth, seven spaces between the teeth being equal in length and the eighth space being somewhat longer, this space being indicated by the numeral 69 in Fig. 7. Mounted on the counter frame 10 is a reciprocable slide 70 which may be manually reciprocated. This slide has a finger 71 mounted in a position substantially tangential to the face of the ratchet wheel 64. When this space 69 is in a position parallel to the finger 71, no tooth will be exposed against which this finger may impinge to turn the ratchet, and in this position the units wheel is in its full cycle position. However, if the units wheel is not in its full cycle position, the teeth on the ratchet wheel will be interposed in the path of the finger 71 successively until the latter is reciprocated a sufficient number of times to position the long space 69 in its path.

In operation of the device, assuming that the mechanism is constructed in accordance with the previous description and the drawings, if it is desired to discharge a given volume of fluid through the meter and to have the latter discontinue automatically when such volume has been discharged, the tripping wheels are set until their counter wheels indicate the desired volume, as previously described. At this time, of course, the shut-off valve to which the latch bar 49 is connected is closed. In opening the valve, the latch bar 49 is moved to a position where it will be engaged and latched in position by engagement of the latch member 51 with the notch 50 in the bar, and the meter commences operating, of course, forthwith upon the opening of the shut-off valve.

As the meter operates, a drive will be transmitted from the shaft 22 to the shaft 25 and consequently to the shaft 27, which, as previously described, will drive the sleeves 34 and 35, the latter imparting a drive to the predetermining counter through the worm 41 and the worm wheel 42.

When the tens, hundreds and thousands wheels reach the zero position, their recesses 43 will come into alignment with the rollers 44 on the fulcrum lever 45, but one of the rollers will still be engaged with the high point of the tripping wheel of the units wheel 30. However, when this reaches the number 1 station, which is one station from zero position, its recess 43 will align with its associated roller 44, allowing the fulcrum lever 45 to move about its pivot 46 in a direction moving the sleeve 34 downwardly and placing the cam 54 in register with the cam roller 53 on the latch member 51. As the cam continues to rotate and its proper circumferential position registers with the roller 53, the latch member 51 will be moved out of engagement with the latch 50 releasing the latch bar and permitting the shut-off valve to close. The latter will do so, of course, because of spring or fluid pressure influence, thereby shutting off the meter operation just as the exact predetermined volume has been discharged from the meter. At this time, of course, the units wheel 30 has reached its zero position.

In the event that it is necessary to shut off the meter before the predetermined amount has been discharged, this can be accomplished through the medium of the emergency release lever 61, as previously described. In the event that the shut-off is effected at a time when the units wheel 30 has not reached a full cycle position, it is necessary to move this units wheel 30 to a full cycle position so that the predetermined quantity on the next operation will be accurately discharged. To move the units wheel to its full cycle position, it is only necessary to operate the slide 70 so that its finger 71 will operate the ratchet wheel 64, as previously described, to move the units wheel to its full cycle position.

From the foregoing it is obvious that I have provided an extremely efficient mechanism for the purposes described, and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In an apparatus of the character described, a plurality of revoluble members, a latch bar, a latch member to engage said bar and latch it in position, a driven rotatable member normally out of register with the latch member but capable when in register therewith to operate the same to disengage it from the latch bar when said rotatable member reaches a definite position in its cycle of operation, and means normally restrained by said revoluble members and automatically operative to position said rotatable member into register with said latch member when said revoluble members reach a predetermined circumferential position.

2. In an apparatus of the character described, a plurality of revoluble members, a latch bar, a latch member to engage said bar and latch it in position, a driven revoluble cam normally out of register with the latch member but capable when in register therewith to operate the same and release the latch bar when said cam reaches a definite position in its cycle of rotation, and an operative connection between said cam and said revoluble members for automatically moving said cam into register with said latch member when said revoluble members reach a predetermined circumferential position.

3. In an apparatus of the character described, a plurality of revoluble numbers, each having a recess in its periphery, a latch bar, a latch member to engage the bar and latch it in position, a driven rotatable member normally out of register with the latch member but capable when in register therewith to operate the same when said rotatable member reaches a definite position in its cycle of operation, and means normally held inactive by said revoluble members and released by the alignment of said recesses to automatically move said rotatable member into register with said latch member.

4. In an apparatus of the character described, a plurality of revoluble members, each having a recess in its periphery, a latch bar, a latch member to engage the bar and latch it in position, a driven rotatable cam normally out of register with the latch member but capable when in register therewith to operate the same and release the bar when said cam reaches a definite position in its cycle of operation, and means normally held inactive by said revoluble members and released by the alignment of said recesses to automatically move said cam into register with said latch member.

5. In an apparatus of the character described, a plurality of revoluble members capable of being set independently to a desired circumferential position, a reciprocable latch bar, a latch member to engage the bar and latch it in position, a drive shaft, a rotatable member mounted on said shaft to be driven therewith but axially movable on said shaft and normally positioned thereon out of register with said latch member but capable when in register therewith to operate the same when said rotatable member reaches a definite position in its cycle of rotation, mechanism associated with said rotatable member and with said revoluble members and capable of automatic operation when said revoluble members reach a definite circumferential position to move said rotatable member into register with said latch member.

6. In an apparatus of the character described, a plurality of revoluble members, a transfer mechanism between said members, said members being capable of being independently set to a desired circumferential position, a reciprocable latch bar, a latch member to engage the bar and latch it in position, a drive shaft, a cam mounted on said shaft to be revolved thereby but capable of axial movement thereon, said cam being normally positioned out of register with said latch member but capable when in register therewith to operate the same and release the latch bar when said cam reaches a definite position in its cycle of rotation, an operative mechanism interposed between said revoluble members and said cam and capable of automatic operation when said revoluble members all reach a predetermined circumferential position to move said cam axially on said shaft into register with said latch member.

7. In an apparatus of the character described, a drive shaft, a plurality of revoluble members, a driving connection between said drive shaft and said revoluble members, a latch bar, a latch member to engage the bar and latch it in position, a cam on said drive shaft and normally driven thereby but capable of axial movement thereon and normally out of register with said latch member but capable when in register therewith to operate the same to release the latch bar when said cam reaches a definite position in its cycle of rotation, and operative means associated with said revoluble members and said cam for moving the latter into register with said latch member when said revoluble members reach a predetermined circumferential position.

8. In an apparatus of the character described, a drive shaft, a plurality of revoluble members, a driving connection between said drive shaft and said revoluble members, said driving connection including an overrunning clutch, a latch bar, a latch member to engage the bar and latch it in position, a cam on said drive shaft and normally driven thereby but capable of axial movement thereon and normally out of register with said latch member when in register therewith to operate the same to release the latch bar when said cam reaches a definite position in its cycle of rotation, and operative means associated with said revoluble members and said cam for moving the latter into register with said latch member when said revoluble members reach a predetermined circumferential position.

9. In an apparatus of the character described, a drive shaft, a plurality of revoluble members, a driving connection between said drive shaft and said revoluble member, a latch bar, a latch member to engage the bar and latch it in position, a cam on said drive shaft and normally driven thereby but capable of axial movement thereon and normally out of register with said latch member but capable when in register therewith to operate the same to release the latch bar when said cam reaches a definite position in its cycle of rotation, means enabling adjustment of said cam circumferentially with respect to its associated driving mechanism, and operative means associated with said revoluble members and said cam for moving the latter into register with said latch member when said revoluble members reach a predetermined circumferential position.

10. In an apparatus of the character described, a driven shaft, a driving shaft, a clutch connection between said shafts, a plurality of revoluble members, a transfer mechanism between the same, a sleeve on said driving shaft, a driving connection between said sleeve and said revoluble members, a driving connection between said sleeve and said driving shaft, said latter connection including an overrunning clutch, a portion of said sleeve being axially movable but nonrotatable with the remainder of the sleeve, a cam carried by said axially movable portion of the sleeve, a latch bar, a latch member to latch said bar in position, said cam being normally out of register with said latch member but capable when in register therewith to move the same out of engagement with said latch bar when said cam reaches a predetermined position in its cycle of rotation, means for circumferentially adjusting said cam with respect to said sleeve, and an operative connection between said revoluble members and said axially movable portion of said sleeve operated upon said members reaching a predetermined circumferential position to move said sleeve and cam so that the latter registers with said latch member.

11. In an apparatus of the character described, a driver shaft, a driving shaft, a clutch connection between said shafts, a plurality of revoluble members, a transfer mechanism between the same, a sleeve on said driving shaft, a driving connection between said sleeve and said revoluble members, a driving connection between said sleeve and said driving shaft, said latter connection including an overrunning clutch, a portion of said sleeve being axially movable but nonrotatable with the remainder of the sleeve, a cam carried by said axially movable portion of the sleeve, a latch bar, a latch member to latch said bar in position, said cam being normally out of register with said latch member but capable when in register therewith to move the same out of engagement with said latch bar when said cam reaches a predetermined position in its cycle of rotation, means for circumferentially adjusting said cam with respect to said sleeve, an operative connection between said revoluble members and said axially movable portion of said sleeve operated upon said members reaching a predetermined circumferential position to move said sleeve and cam so that the latter registers with said latch member, and manually operated release means capable of being independently operated to disengage said latch member from the latch bar.

12. In an apparatus of the character described, a driven shaft, a driving shaft, a clutch connection between said shafts, a plurality of revoluble members, a transfer mechanism between the same, a sleeve on said driving shaft, a driving connection between said sleeve and said revoluble members, a driving connection between said sleeve and said driving shaft, said latter connection including an overrunning clutch, a portion of said sleeve being axially movable but nonrotatable with the remainder of the sleeve, a cam carried by said axially movable portion of the sleeve, a latch bar, a latch member to latch said bar in position, said cam being normally out of register with said latch member but capable when in register therewith to move the same out of engagement with said latch bar when said cam reaches a predetermined position in its cycle of rotation, means for circumferentially adjusting said cam with respect to said sleeve, an operative connection between said revoluble members and said axially movable portion of said sleeve operated upon said members reaching a predetermined circumferential position to move said sleeve and cam so that the latter registers with said latch member, manually operated release means capable of being independently operated to disengage said latch member from the latch bar, and means for revolving said sleeve independently of the driving shaft to position said revoluble members in their full cycle position after operation of said manually operated release means.

13. In a device of the character described, a shiftable latch member, a pivoted latch movable pivotally into and out of latching engagement with the member, a cam movable axially into and out of the effective plane of the latch and, when in said plane, being operative by its rotation to swing the latch out of engagement with the member, and means for shifting the cam axially, said means including a lever pivoted intermediate its ends, one end of the lever being engageable with the latch-cam, spring means tending to pivotally move the lever in a direction to shift the latch cam in one direction, and a rotatable member engageable with the other end of the lever for pivotally moving it in the opposite direction.

14. In combination with a rotatable counter wheel, a drum rotatable with the wheel, a cam on the periphery of the drum, a shiftable latch member, a pivoted latch movable pivotally into and out of latching engagement with the member, a cam movable axially into and out of the effective plane of the latch and, when in said plane, being operative by its rotation to swing the latch out of engagement with the member, a lever pivoted intermediate its ends, one end of the lever being engageable with the latch-cam, spring means tending to pivotally move the lever in a direction to shift the latch-cam in one direction, the other end of said lever being engageable by said drum cam whereby said lever is pivotally movable in the opposite direction by virtue of drum rotation.

15. In an apparatus of the character described, a plurality of revoluble members, a latch bar, a latch member to engage said bar and latch it in position, a driven rotatable member normally out of register with the latch member but capable when in register therewith to operate the same to disengage it from the latch bar when said rotatable member reaches a definite position in its cycle of operation, means normally restrained by said revoluble members and automatically operative to position said rotatable member into register with said latch member when said revoluble members reach a predetermined circumferential position, and manually operated release means capable of being independently operated to disengage said latch member from the latch bar.

16. In a device of the character described, a revoluble member capable of being manually revolubly set to a desired circumferential position, a latch bar, a latch member to engage said bar and latch it in position, a driven rotatable member movable into and out of register with the latch member but capable when in register therewith to operate the same to disengage it from the latch bar when said rotatable member reaches a definite position in its cycle of operation, and means engaged with the rotatable member and operated by initial setting-rotation of the revoluble member to move said rotatable member out of register with the latch member.

17. In a device of the character described, a revoluble member capable of being manually revolubly set to a desired circumferential position, a latch bar, a latch member to engage said bar and latch it in position, a driven rotatable member movable into and out of register with the latch member but capable when in register therewith to operate the same to disengage it from the latch bar when said rotatable member reaches a definite position in its cycle of operation, and means engaged with the rotatable member and operated by initial setting-rotation of the revoluble member to move said rotatable member out of register with the latch member and operated by virtue of subsequent rotation of the revoluble member from said position to move said rotatable member into register with the latch member.

WILLIAM F. BERCK.